United States Patent
Singaraju et al.

(10) Patent No.: US 10,547,647 B2
(45) Date of Patent: *Jan. 28, 2020

(54) INTRA-CARRIER AND INTER-CARRIER NETWORK SECURITY SYSTEM

(71) Applicant: AT&T Intellectual Property I, L.P., Atlanta, GA (US)

(72) Inventors: Gokul Singaraju, Edison, NJ (US); Ashutosh Dutta, Bridgewater, NJ (US); Thusitha Jayawardena, Holmdel, NJ (US); Christopher Van Wart, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,315

(22) Filed: Jan. 29, 2019

(65) Prior Publication Data

US 2019/0158542 A1    May 23, 2019

Related U.S. Application Data

(63) Continuation of application No. 14/812,656, filed on Jul. 29, 2015, now Pat. No. 10,230,767.

(51) Int. Cl.
*H04L 29/06*    (2006.01)

(52) U.S. Cl.
CPC ........ *H04L 63/205* (2013.01); *H04L 63/0263* (2013.01); *H04L 63/1416* (2013.01); *H04L 63/1425* (2013.01); *H04L 63/1458* (2013.01)

(58) Field of Classification Search
CPC ............... H04L 63/205; H04L 63/0263; H04L 63/1416; H04L 63/1425; H04L 63/1458
See application file for complete search history.

(56) References Cited

U.S. PATENT DOCUMENTS

| 7,917,627 B1 | 3/2011 | Andriantsiferana et al. |
| 8,131,305 B2 | 3/2012 | Zee et al. |
| 8,219,697 B2 | 7/2012 | Langen et al. |

(Continued)

OTHER PUBLICATIONS

Henrydoss et al., "Critical security review and study of DDoS attacks on LTE mobile network," IEEE Asia Pacific Conference on Wireless and Mobile, Aug. 28-30, 2014, p. 194-200; doi: 10.1109/APWiMob.2014.6920286, Abstract Only. http://ieeexplore.ieee.org/xpl/login.jsp?tp=&arnumber=6920286.

(Continued)

*Primary Examiner* — Ashokkumar B Patel
*Assistant Examiner* — Forrest L Carey
(74) *Attorney, Agent, or Firm* — Akerman LLP; Michael K. Dixon; Mammen (Roy) P. Zachariah, Jr.

(57) ABSTRACT

A system and method for identifying distributed attacks, such as, but not limited to, distributed denial of service attacks and botnet attacks, in a first network serviced by a first carrier and configured to alert a second network serviced by a second carrier that is different from the first carrier is disclosed. Once an attack has been identified, an attack alert is generated and provided to the second network or other aspects of the first network, or both. The attack alerts may be distributed dynamically with the second network via diameter based security protocol Rs. Such system and method may mitigate distributed malicious attacks by sharing destination internet protocol and bad international mobile subscriber identity information across carriers.

20 Claims, 6 Drawing Sheets

(56) References Cited

U.S. PATENT DOCUMENTS

| | | | |
|---|---|---|---|
| 8,521,775 | B1 | 8/2013 | Poh et al. |
| 8,582,473 | B2 | 11/2013 | Ramankutty et al. |
| 8,582,567 | B2 | 11/2013 | Kurapati et al. |
| 8,627,422 | B2 | 1/2014 | Hawkes et al. |
| 8,695,095 | B2 | 4/2014 | Baliga et al. |
| 8,825,767 | B2 | 9/2014 | Sivavakeesar |
| 8,904,527 | B2 | 12/2014 | Dawson et al. |
| 8,924,574 | B2 | 12/2014 | Alex et al. |
| 8,978,136 | B2 | 3/2015 | Day |
| 8,982,694 | B2 | 3/2015 | Zhang et al. |
| 8,984,627 | B2 | 3/2015 | Ormazabal |
| 2006/0059551 | A1 | 3/2006 | Borella |
| 2006/0225128 | A1 | 10/2006 | Aittola et al. |
| 2008/0070550 | A1 | 3/2008 | Hose |
| 2010/0124223 | A1 | 5/2010 | Gibbs et al. |
| 2010/0218250 | A1 | 8/2010 | Mori et al. |
| 2012/0036559 | A1 | 2/2012 | Zabawskyj et al. |
| 2013/0114460 | A1 | 5/2013 | Rubio et al. |
| 2014/0068748 | A1 | 3/2014 | Mann et al. |
| 2014/0105103 | A1 | 4/2014 | Nethi et al. |
| 2014/0105119 | A1 | 4/2014 | Gupta et al. |
| 2015/0270978 | A1 | 9/2015 | Shrader et al. |
| 2016/0261754 | A1 | 9/2016 | Keller et al. |
| 2017/0012824 | A1 | 1/2017 | Goyal et al. |

OTHER PUBLICATIONS

Seddigh et al., "Security advances and challenges in 4G wireless networks," International Conference on Privacy Security and Trust, Aug. 17-19, 2010, p. 62-71; doi: 10.1109/PST.2010.5593244, Abstract only. http://ieeexplore.ieee.org/xpl/login.jsp?tp=&arnumber=5593244.

Leung et al., "The security challenges for mobile ubiquitous services," Information Security Technical Report (2007) 12(3):162-171; doi: 10.1016/j.istr.2007.05.001, Abstract only. http://www.sciencedirect.com/science/article/pii/S1363412707000209.

Arunmozhi et al., "DDoS Attack and Defense Scheme in Wireless Ad hoc Networks," International Journal of Network Security & Its Applications (May 2011) 3(3); doi: 10.5121/ijnsa.2011.3312, Abstract only. http://arxiv.org/abs/1106.1287.

Rs DIAMETER SECURITY ALERT REQUEST
(SAR)

- SAR ::= < DIAMETER HEADER: 272, REQ, PXY>
-         < SESSION-Id>
-         { AUTH-APPLICATION-Id }
-         { ORIGIN-HOST } { ORIGIN-REALM }
-         { DESTINATION-REALM } [ DESTINATION-HOST ]
-         [ AF-APPLICATION-IDENTIFIER ]*
-         [ MEDIA-COMPONENT-DESCRIPTION ] ETSI 3GPP TS 29.214 VERSION 7.4.0 RELEASE 7 26 ETSI TS 129 214 V7.4.0 (2008-04)
-         [ SERVICE-INFO-STATUS ] [ AF-CHARGING-IDENTIFIER ]
-         [ SIP-FORKING-INDICATION ]*
-         [ SPECIFIC-ACTION ]* :INDICATION_OF_SECURITY_ALERT
-         [ CVE-ID]
-         [ SUBSCRIPTION-ID ] [ RESERVATION-PRIORITY ]
-         [ 3GPP-IMSI ]*
-         [ FRAMED-IP-ADDRESS ]*
-         [ FRAMED-IPv6-PREFIX ]*
-         [ SERVICE-URN ]
-         [ ORIGIN-STATED-Id ]*
-         [ PROXY-INFO ]*
-         [ ROUTE-RECORD ]*
-         [ AVP ]

FIG. 5

INTRA-CARRIER AND INTER-CARRIER NETWORK SECURITY SYSTEM

CROSS REFERENCE TO RELATED APPLICATIONS

This application is a continuation of and claims the benefit of U.S. application Ser. No. 14/812,656, filed Jul. 29, 2015, which is hereby incorporated by reference in its entirety.

FIELD OF THE DISCLOSURE

The present disclosure generally relates to communications networks, and more particularly relates systems and methods for detecting and mitigating distributed denial of service attacks.

BACKGROUND

Packet-switched networks rely on the efficient transmission of packets across network links. Malicious entities often attempt to disrupt this efficient data flow using distributed denial-of-service (DDoS) attacks whereby a network device is flooded with a large volume of network traffic. The resources and bandwidth of the network device are then consumed in handling this flood of network traffic. When a network controlled by an operator identifies a DDoS attack, the information is retained within the system and not shared with other carriers, otherwise known as providers or operators. Each network has limited visibility in that each network only has visibility to a very small percentage of mobile internet traffic.

SUMMARY

A system and method for identifying distributed attacks, such as, but not limited to, distributed denial of service attacks and botnet attacks, in a first network serviced by a first carrier and configured to alert other networks, such as a second network serviced by a second carrier that is different from the first carrier is disclosed. Once an attack has been identified, an attack alert is generated and provided to the second network or other aspects of the first network, or both. The attack alerts may be distributed dynamically with the second network via diameter based security protocol Rs. Such system and method may mitigate distributed malicious attacks by sharing destination internet protocol and bad international mobile subscriber identity information across carriers.

The method may include analyzing internet traffic to determine occurrence of a distributed attack within a first network administered by a first carrier, generating an attack alert when an attack is identified, providing the attack alert, and whereby providing the attack alert comprises providing the attack alert to a second network administered by a second carrier, whereby the first and second carriers are different entities, such as different corporate entities. In at least one embodiment, the distributed attack may be a distributed denial of service (DDoS) attack or a botnet attack. The step of providing the attack alert to the second network administered by the second carrier may be provided via diameter based security protocol. The step of providing the attack alert may further include providing the attack alert to other aspects of the first network administered by the first carrier. The step of analyzing traffic to determine occurrence of an attack within a first network administered by a first carrier may include analyzing traffic via deep packet inspection engine analyzing traffic at an evolved packet core within the first network.

In at least one embodiment, the step of analyzing traffic to determine occurrence of an attack within a first network administered by a first carrier may include interrogating a policy and charging rules function by an application function to analyze protocol addresses. Interrogating a policy and charging rules function by an application function to analyze protocol addresses may include analyzing local internet protocol addresses and remote internet protocol addresses. The step of providing the attack alert may include initiating, via an application function within the first network, a Rs security protocol to send the attack alert to a second network. The alert attack may be sent from the application function to an applied function aggregator within the first network. The alert attack may be sent from the application function aggregator to the second network. In particular, in at least one embodiment, the alert attack may be sent from the application function aggregator in the first network to an application function in the second network. The step of providing the attack alert may include providing the attack alert including information such as, but not limited to, a malicious internet protocol address or a malicious international mobile subscriber identity, or both. The application function may use a PUSH procedure over an Rx Diameter interface to mitigate DDos attacks on identified devices.

The system may include a memory that stores instructions and a processor that executes the instructions to perform operations, the operations including analyzing internet traffic to determine occurrence of a distributed attack within a first network administered by a first carrier, generating an attack alert when an attack is identified, providing the attack alert, and wherein providing the attack alert includes providing the attack alert to a second network administered by a second carrier, whereby the first and second carriers are different entities. The operation of providing the attack alert to the second network administered by the second carrier is further provided via diameter based security protocol. The operation of analyzing traffic to determine occurrence of an attack within a first network administered by a first carrier may further include analyzing traffic via deep packet inspection engine analyzing traffic at an evolved packet core within the first network. The operation of analyzing traffic to determine occurrence of an attack within a first network administered by a first carrier may further include interrogating a policy and charging rules function by an application function to analyze protocol addresses. The operation of interrogating a policy and charging rules function by an application function to analyze protocol addresses may further include analyzing local internet protocol addresses and remote internet protocol addresses.

The operation of providing the attack alert may further include initiating, via an application function within the first network, a Rs security protocol to send the attack alert to a second network. The alert attack may be sent from the application function to an applied function aggregator within the first network and may be sent from the application function aggregator to the second network. The alert attack may be sent from the application function aggregator in the first network to an application function in the second network.

A computer-readable device may include instructions, which when executed by a processor, cause the processor to perform operations including analyzing internet traffic to determine occurrence of a distributed attack within a first network administered by a first carrier, generating an attack alert when an attack is identified, providing the attack alert; and wherein providing the attack alert comprises providing the attack alert to a second network administered by a second carrier, whereby the first and second carriers are different entities.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention. For simplicity and clarity of illustration, elements illustrated in the Figures have not necessarily been drawn to scale. For example, the dimensions of some of the elements are exaggerated relative to other elements.

FIG. 5 is an exemplary Rs Diameter Security Alert Request that may be sent between networks alerting networks to malicious IP addresses and international mobile subscriber identity (IMSI)

DETAILED DESCRIPTION OF THE DRAWINGS

Figure 1:
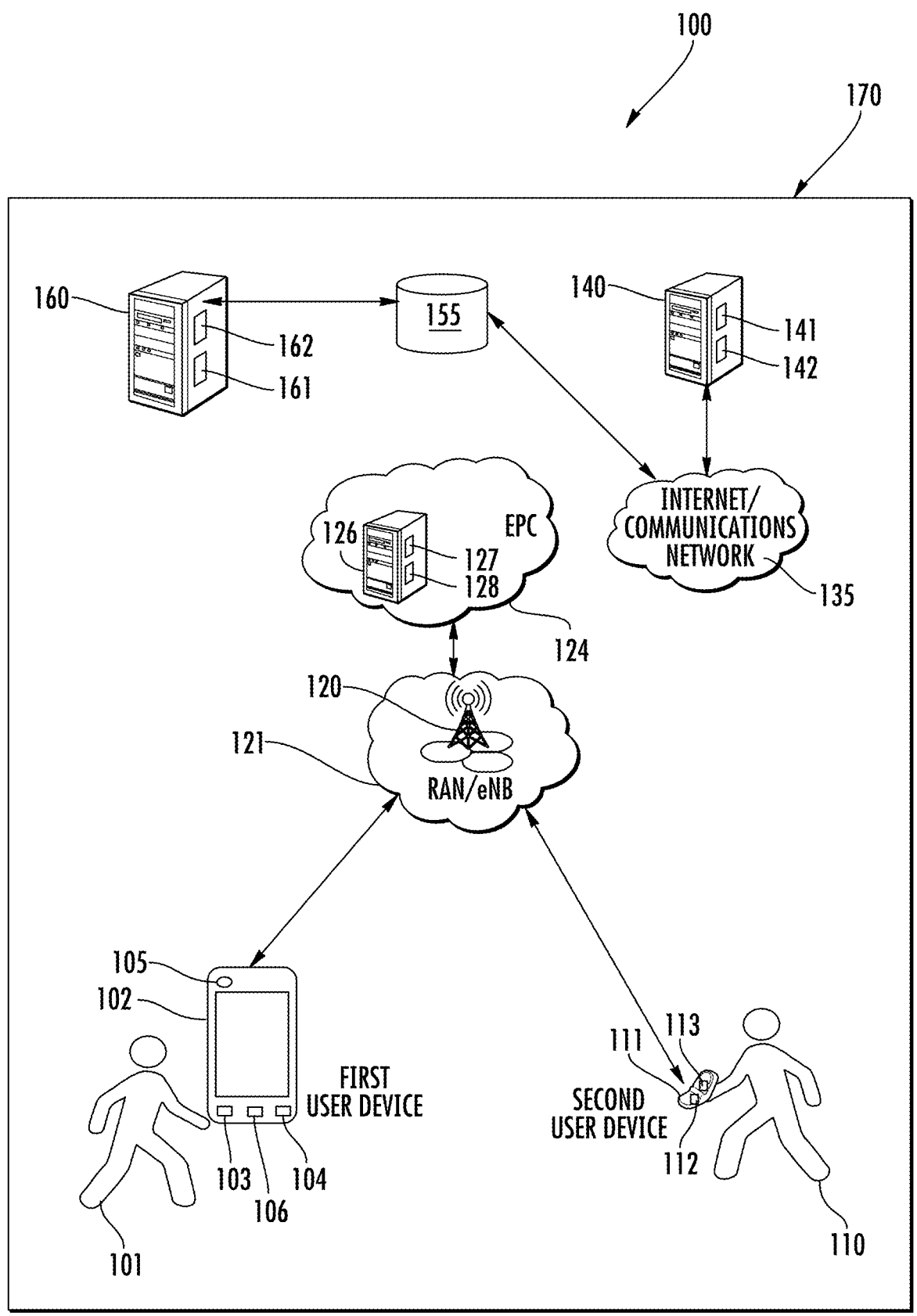
FIG. 1 is a block diagram illustrating a communications network in accordance with one embodiment of the present disclosure.

A system 100 and methods, as shown in FIGS. 1-6, for identifying distributed attacks, such as, but not limited to, distributed denial of service attacks and botnet attacks, in a first network 170 serviced by a first carrier 172 and configured to alert a second network 174 serviced by a second carrier 176 that is different from the first carrier 172 is disclosed. Once an attack has been identified, an attack alert is generated and provided to the second network 174 or other aspects of the first network 170, or both. The attack alerts may be distributed dynamically with the second network 174 via diameter based security protocol Rs. Such system and method may mitigate distributed malicious attacks by sharing destination internet protocol and bad international mobile subscriber identity information across carriers.

The system 100 and accompanying methods for identifying distributed attacks, such as, but not limited to, distributed denial of service attacks and botnet attacks, within a first network 170 and notifying other networks, such as second network 174, are disclosed, as shown in FIGS. 1-6. In particular, as shown in FIG. 1, the system 100 and methods may utilize radio access networks (RANs) 121 to enable user equipment nodules 102, 111 to communicate with each other and to receive content from various content delivery networks. As shown in FIG. 1, the system 100 may be configured to support, but is not limited to supporting, cloud computing services, content delivery services, satellite services, Long-Term Evolution (LTE) services, telephone services, voice-over-internet protocol services (VoIP), software as a service (SaaS) applications, gaming applications and services, productivity applications and services, mobile applications and services, and any other computing applications and services. The system may include a first user 101 that may utilize first user device 102 to access content, data, and services, to initiate and participate in communications sessions, or to perform a variety of other functions. As an example, the first user 101 may utilize first user device 102 to engage in a communications session, such as a telephone call or a chat session, with a second user 110 that may be utilizing second user device 111. As another example, the first user 101 may utilize the first user device 102 to request various types of media content from the content delivery network 124, from the second user device 111, or a combination thereof.

In certain embodiments, the first user device 102 and second user device 111 may be computers, servers, mobile devices, smartphones, computer tablets, phablets, or any other computing devices. Illustratively, the first user device 102 is shown as a smartphone in FIG. 1. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. Furthermore, the first user device 102 may also include a global positioning sensor 106 that may be configured to provide location information for the first user device 102 and location information for the first user 101 that is using the first user device 102. The second user device 111 may include a memory 112 that includes instructions, and a processor 113 that executes the instructions from the memory 112 to perform various operations that are performed by the second user device 111. The processor 113 may be hardware, software, or a combination thereof. Illustratively, second user device 111 is shown as a mobile device in FIG. 1.

The first user 101 and the second user 110 may utilize the first user device 102 and second user device 111, respectively, to participate in communications sessions with each other. Additionally, the first user 101 and the second user 110 may utilize the first user device 102 and the second user device 111 to access and obtain various types of content and services, such as, but not limited to, audio content, video content, web content, text content, any type of content, or any combination thereof. Furthermore, the first and second users 101, 110 may utilize the first and second user devices 102, 111 to perform a variety of other tasks and functions. In certain embodiments, the first user device 102 and second user device 111 may include software applications that may include a cloud-based application, gaming application, an internet-based application, a browser application, a mobile application, a productivity application, a video application, a music application, a streaming media application, a social media application, any other type of application, or a combination thereof. In certain embodiments, the software applications may include one or more graphical user interfaces for the first and second users 101, 110 so as to enable the first and second users 101, 110 to readily interact with the software applications. In certain embodiments, at least a portion of the software application may be configured to execute directly on the first user device 102 and second user device 111; however, in other embodiments, the software application may be configured to execute on the other devices and components in the system 100.

The system 100 may also be configured to include RAN hardware element 120, which may reside within a RAN 121. The RAN 121 may be configured to include one or more local area networks (LANs). In certain embodiments, the RAN hardware element 120 may include an eNodeB element, such as used in an LTE network or other similar network, and may also include any number of processors and memories. The RAN hardware element 120 may be configured to connect directly with the first and second user devices 102, 111 via the RAN 121. Additionally, the RAN hardware element 120 may include any of the functionality of a base station utilized in mobile communication networks.

The system 100 may also include one or more content delivery networks 124. The content delivery network 124 may be an evolved packet core (EPC) network that may be configured to serve as the core network in the system 100. The EPC network 124 may include one or more servers 126 one or more processors 127 that may be configured to process any of the various functions of the system 100. The processors 127 may be software, hardware, or a combination of hardware and software. Additionally, the server 126 may also include a memory 128, which stores instructions that the processors 127 may execute to perform various operations of the system 100. For example, the server 126 may assist in processing loads handled by the various devices in the system 100. In one embodiment, multiple servers 126 may be utilized to process the functions of the system 100. The server 126 and other devices in the system 100, may utilize the database 155 for storing data about the devices in the system 100 or any other information that is associated with the system 100. In one embodiment, multiple databases 155 may be utilized to store data in the system 100. The EPC network 124 may be configured to provide both a voice and data networking framework for connecting the first and second users 101, 110, such as on an LTE network. In certain embodiments, the EPC network 124 may include any of the components and functionality found in traditional EPC networks 124, and may be configured to be communicatively linked with communications network 135. The content delivery network 124 may be an internet protocol television network that may be configured to deliver media content and services using an internet protocol suite and by utilizing packet switching. The EPC network 124 may be configured to communicatively link with the RAN hardware element 121.

The communications network 135 of the system 100 may be configured to link each of the devices in the system 100 to one another, and be configured to transmit, generate, and receive any information and data traversing the system 100. In one embodiment, the communications network 135 may include any number servers, databases, or other componentry. The communications network 135 may be configured to communicatively link with the server 126 within the EPC network 124, the server 140, the database 155, and the server 160. The communications network 135 may also include and be connected to a cloud-computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the communications network 135 may be part of a single autonomous system that is located in a particular geographic region, or be part of multiple autonomous systems that span several geographic regions.

Notably, the functionality of the system 100 may be supported and executed by using any combination of the servers 140 and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. In certain embodiments, the servers 140 and 160 may be network servers, routers, gateways, computers, mobile devices or any other suitable computing device. In certain embodiments, the server 140 may be communicatively linked to the communications network 135, the EPC network 124, any network, or any combination thereof. Additionally, in certain embodiments, the server 140 may serve as a shared content source for certain types services and requests. For example, the server 140 may serve as a shared content source for real-time feeds requested by the first and second users 101, 110, as a shared content source for content of a certain resolution level, as a shared content source for certain types of content, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the EPC network 124. Additionally, the database 155, in certain embodiments, may serve as a shared content source for stored content that may be accessed and shared by the networks 124, 135 so that the networks 124, 135 may obtain content for the first and second users 101, 110 in an efficient and effective manner. As a result, the database 155 may serve as a central repository for content and information requested by the first and second users 101, 110. Furthermore, the database 155 may include a processor and memory or be connected to a processor and memory to perform the various operation associated with the database 155. In certain embodiments, the database 155 may be connected to servers 140, 160, first user device 102, second user device 111, the hardware element 120, or any combination thereof.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 111, a hardware element 120, an EPC network 124, a communications network 135, a server 140, a server 160, and a database 155. However, the system 100 may include multiple first user devices 102, multiple second user devices 111, multiple EPC networks 124, multiple communications networks 135, multiple servers 140, 160, multiple databases 155, or any number of any of the other components in the system 100. Furthermore, in certain embodiments, substantial portions of the functionality and operations of the system 100 may be performed by other networks and systems that may be connected to system 100.

Figure 2:
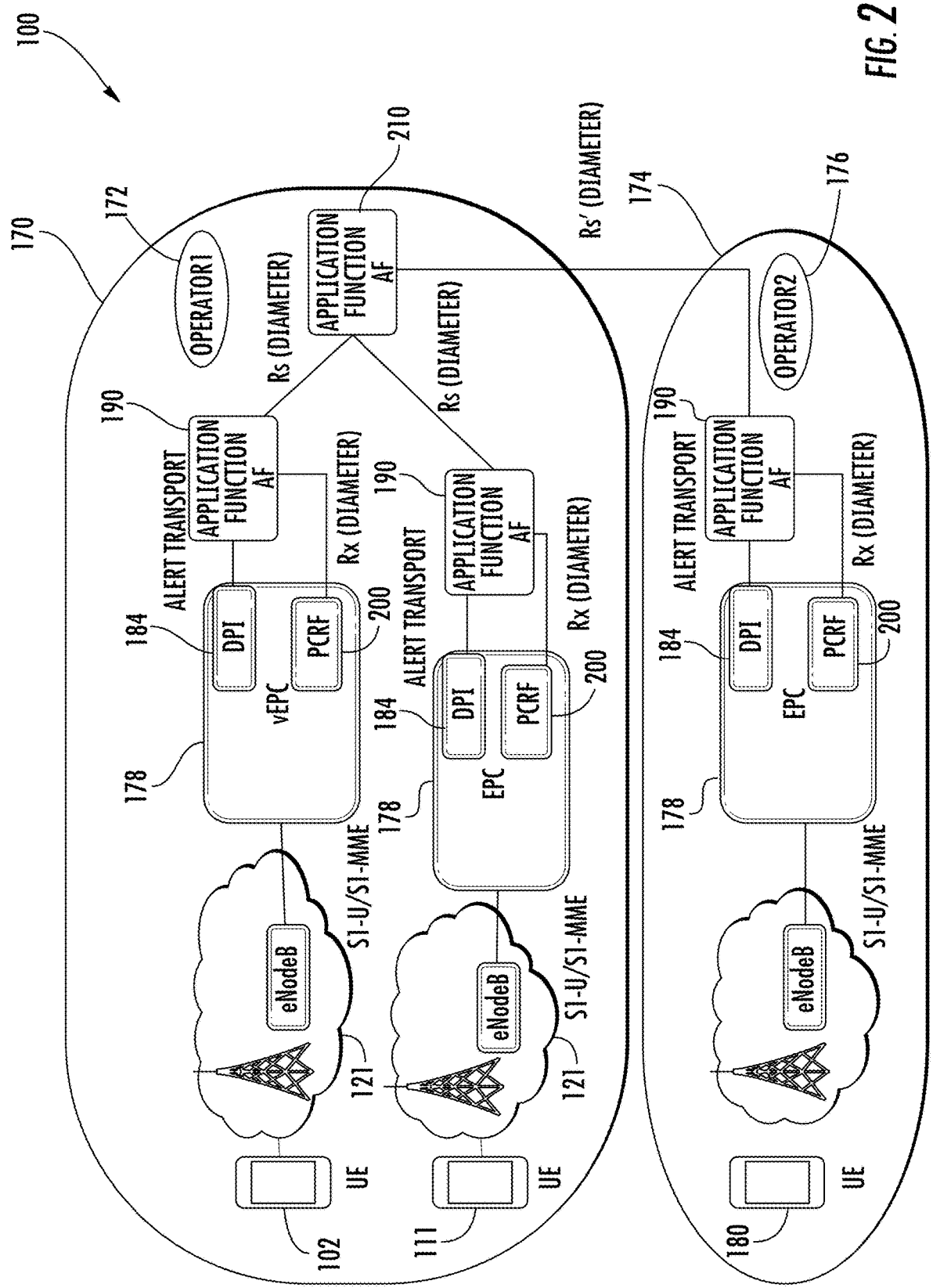
FIG. 2 is a block diagram illustrating two communications networks, whereby each network is operated by different carriers.

The system 100, as shown in FIG. 2, may include a first network 170 operated by a first carrier 172 and a second network 174 operated by a second carrier 176. The first and second carriers 120, 140 may be altogether different entities, such as different legal corporate entities, may be different entities owned by the same parent entity or person or the like. The first and second carriers 120, 140 are entities that are controlled separately from each other regardless of ownership of the first and second carriers 120, 140.

The system 100, as shown in FIG. 2, may include one or more evolved packet core (EPC) networks 178, which may also be a system architecture evolution core (SAE core) or a virtual evolved packet core (vEPC). The EPC networks 178 may include one or more servers. One or more user equipment modules (UE) 102, 111, 180 may be coupled to the EPC 178 via one or more communications modules 170, such as the evolved node B (eNodeB). The evolved packet core (EPC) server 178 may include one or more deep packet inspection engines 184 (DPI) configured to analyze internet traffic to determine occurrence of a distributed attack within the first network 170 administered by the first carrier 172 or other carriers. The DPI engine 184 may tap into the Third Generation Partnership Project (3GPP) standard interfaces. The DPI engine 184 may perform user correlation and traffic analysis of the Long-Term Evolution (LTE) and or the Universal Mobile Telecommunications System (UMTS) network data to detect incoming and outgoing bad Internet Protocol (IP) addresses in malicious attack and generate attack alerts. The DPI engine 184 may perform traffic analysis that is based upon signature, uniform resource locator (URL), bandwidth and the like.

The system 100 may include one or more application functions 190 (AF) in communication with the evolved packet core (EPC) server 178, and more particularly, with the DPI engine 184 and a policy and charging rules function module (PCRF) 200. The application function 190 may be configured to interrogate the PCRF 200, which may be configured to maintain all IP connectivity access network (CAN) sessions to analyze local IP addresses and remote IP addresses involved in an attack. Such communications is additional protocol not conforming to current 3GPP standards. The application function 190 may communicate with the PCRF 200 via an Rx interface with Diameter protocol.

The system 100 may include one or more application function aggregator routers 210 in communication with one or more application functions 190 in the first network 170. In at least one embodiment, the application function aggregator router 210 may communicate with the application function 190 via an Rs interface with Diameter protocol.

The system 100 may include a second network 174 having one or more servers 178, such as, but not limited to, an evolved packet core (EPC), which may also be a system architecture evolution core (SAE core) or a virtual evolved packet core (vEPC). One or more user equipment modules (UE) 102, 111, 180 may be coupled to the EPC 178 via one or more RAN communications modules 121, such as the evolved node B (eNodeB). The evolved packet core (EPC) server 178 may include one or more deep packet inspection engines 184 (DPI) configured to analyze internet traffic to determine occurrence of a distributed attack within the first network 170 administered by the first carrier 172 or other carriers. The DPI engine 184 may tap into the Third Generation Partnership Project (3GPP) standard interfaces. The DPI engine 184 may perform user correlation and traffic analysis of the Long-Term Evolution (LTE) and or the Universal Mobile Telecommunications System (UMTS) network data to detect incoming and outgoing bad Internet Protocol (IP) addresses in malicious attack and generate attack alerts. The DPI engine 184 may perform traffic analysis that is based upon signature, uniform resource locator (URL), bandwidth and the like.

The second network 174 may include one or more application functions 190 (AF) in communication with the evolved packet core (EPC) server 178, and more particularly, with the DPI engine 184 and a policy and charging rules function module (PCRF) 200. The application function 190 may be configured to interrogate the PCRF 200, which may be configured to maintain all IP connectivity access network (CAN) sessions to analyze local IP addresses and remote IP addresses involved in an attack. Such communications is additional protocol not conforming to current 3GPP standards. The application function 190 may communicate with the PCRF 200 via an Rx interface with Diameter protocol. The application function 190 of the second network 174 may be in communication with the one or more application function aggregator routers 210 of the first network 170. In at least one embodiment, the application function aggregator router 210 may communicate with the application function 190 via an Rs' interface with Diameter protocol.

The security architecture of the system 100 may be configured such that the application function 190 of the first network 170 may initiate an unsolicited PUSH request to the PCRF 200 to block user traffic for local IP addresses. The PUSH request initiated by the application function 190 may conform to the 3GPP standard. The application function 190 may be networked hierarchically within the first and second networks 110, 130 and outside of the first and second networks 110, 130 Diameter based Rs and Rs' security protocol. Rs Diameter security protocol has all the advantages of diameter standardization including transmission layer security and peer discovery and configuration. The security architecture of the system 100 may be configured such that the application function aggregator router 210 of the first network 170 acts as an aggregator and router for remote external IP addresses, consolidates attack information from all internal operator application functions 190 and sends requests to external the application function 190 of the second network 174 or others. The security architecture of the system 100 may be configured such that the attack alert generated may be a security attach attribute value pair (AVP) defined to describe security classification common vulnerabilities and exposures (CVE) of attack, for example, DDoS ort Botnet, for mitigation by external operators or carriers, such as, but not limited to, the second carrier 176.

In at least one embodiment of the invention, the system 100 may operate by method of analyzing at 240 internet traffic to determine occurrence of a distributed attack within the first network 170 by the first carrier 172, generate at 250 an attack alert when an attack, such as, but not limited to a distributed denial of service (DDoS) attack or a botnet attack, is identified, and provide at 260 the attack alert, wherein providing the attack alert comprises providing the attack alert to the second network 174 administered by the second carrier 176, whereby the first and second carriers 120, 140 are different entities, such as different carriers. The method may include implementing local mitigation using unsolicited PUSH procedures and propagation of the attack alerts over Rs Diameter protocol (security alert request (SAR)/security alert answer (SAA)) to other networks 174 applied function aggregators and/or routers. The method may include implementing local mitigation using unsolicited PUSH procedures within the corresponding networks.

Figure 3:
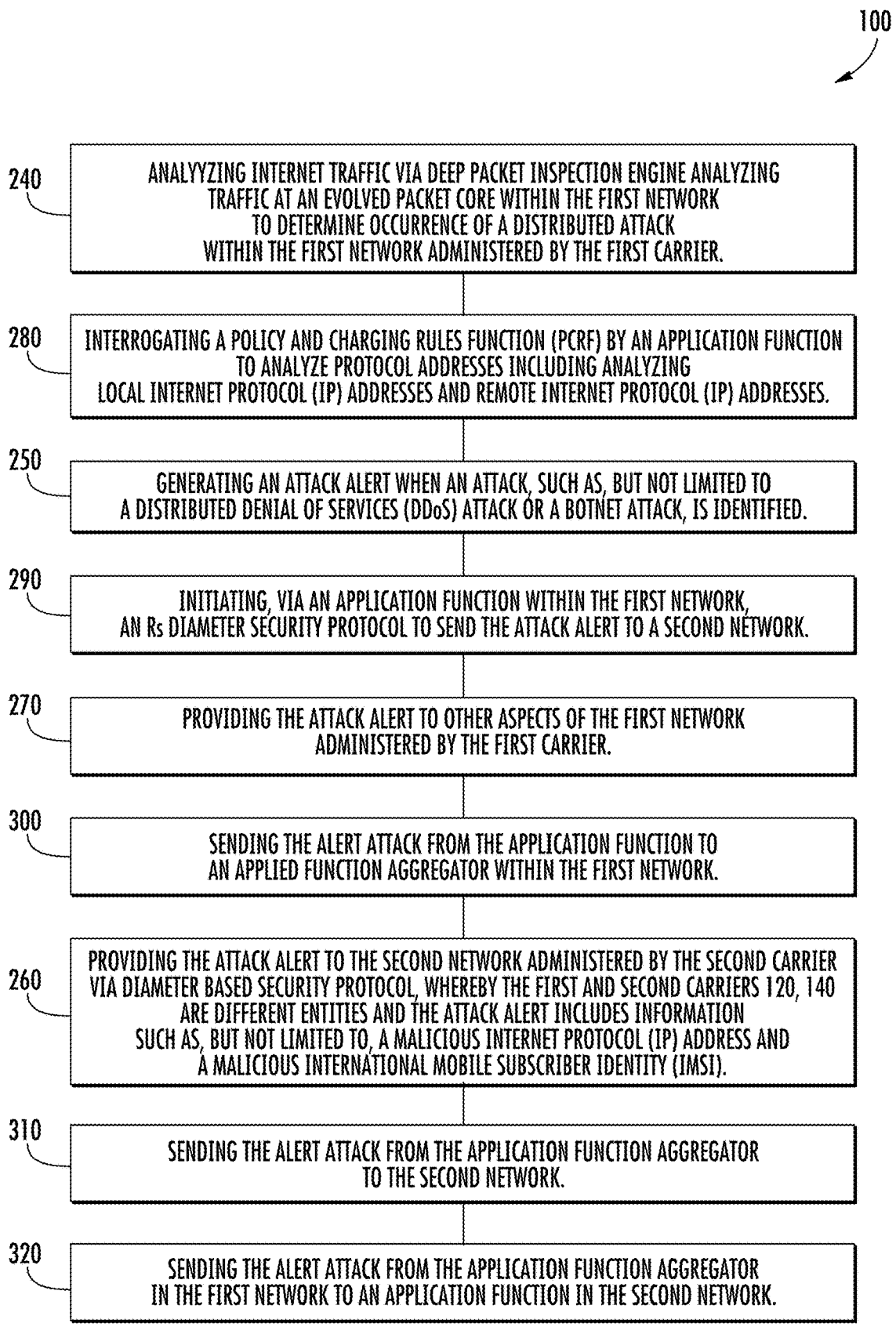
FIG. 3 is a flow diagram illustrating a method of using the systems of FIGS. 1 and 2.

In at least one embodiment of the invention, as shown in FIG. 3, the system 100 may operate by method of analyzing at 240 internet traffic to determine occurrence of a distributed attack within the first network 170 administered by the first carrier 172, generate at 250 an attack alert when an attack, such as, but not limited to a distributed denial of service (DDoS) attack or a botnet attack, is identified, and provide at 260 the attack alert, wherein providing the attack alert comprises providing the attack alert to the second network 174 administered by the second carrier 176, whereby the first and second carriers 120, 140 are different entities. The method of operating the system 100 by providing at 260 the attack alert may include providing at 270 the attack alert to other aspects of the first network 170 administered by the first carrier 130. The method of operating the system 100 by providing at 260 the attack alert to the second network 174 administered by the second carrier 176 is provided via diameter based security protocol.

The method of operating the system 100 by analyzing traffic at 240 to determine occurrence of an attack within the first network 170 administered by the first carrier 172 may include analyzing traffic via deep packet inspection engine 184 analyzing traffic at an evolved packet core 178 within the first network 170. The method of operating the system 100 by analyzing traffic at 240 to determine occurrence of an attack within the first network 170 administered by the first carrier 172 may include interrogating at 280 a policy and charging rules function (PCRF) 200 by an application function 190 to analyze protocol addresses. The method of operating the system 100 by interrogating a policy and charging rules function (PCRF) 200 by an application function 190 to analyze protocol addresses may include analyzing local internet protocol (IP) addresses and remote internet protocol (IP) addresses.

The method of operating the system 100 by providing at 260 the attack alert may include initiating, via an application function 190 within the first network 170, at 290 a Rs security protocol to send the attack alert to a second network 174. The alert attack at 300 may be sent from the application function 190 to an applied function aggregator 210 within the first network 170. The alert attack at 310 may be sent from the application function aggregator to the second network. The alert attack at 320 may be sent from the application function aggregator 210 in the first network 170 to an application function 190 in the second network 174. The method of operating the system 100 by providing the attack alert may include providing the attack alert at 260 including information such as, but not limited to, a malicious internet protocol (IP) address and a malicious international mobile subscriber identity (IMSI).

Figure 4:
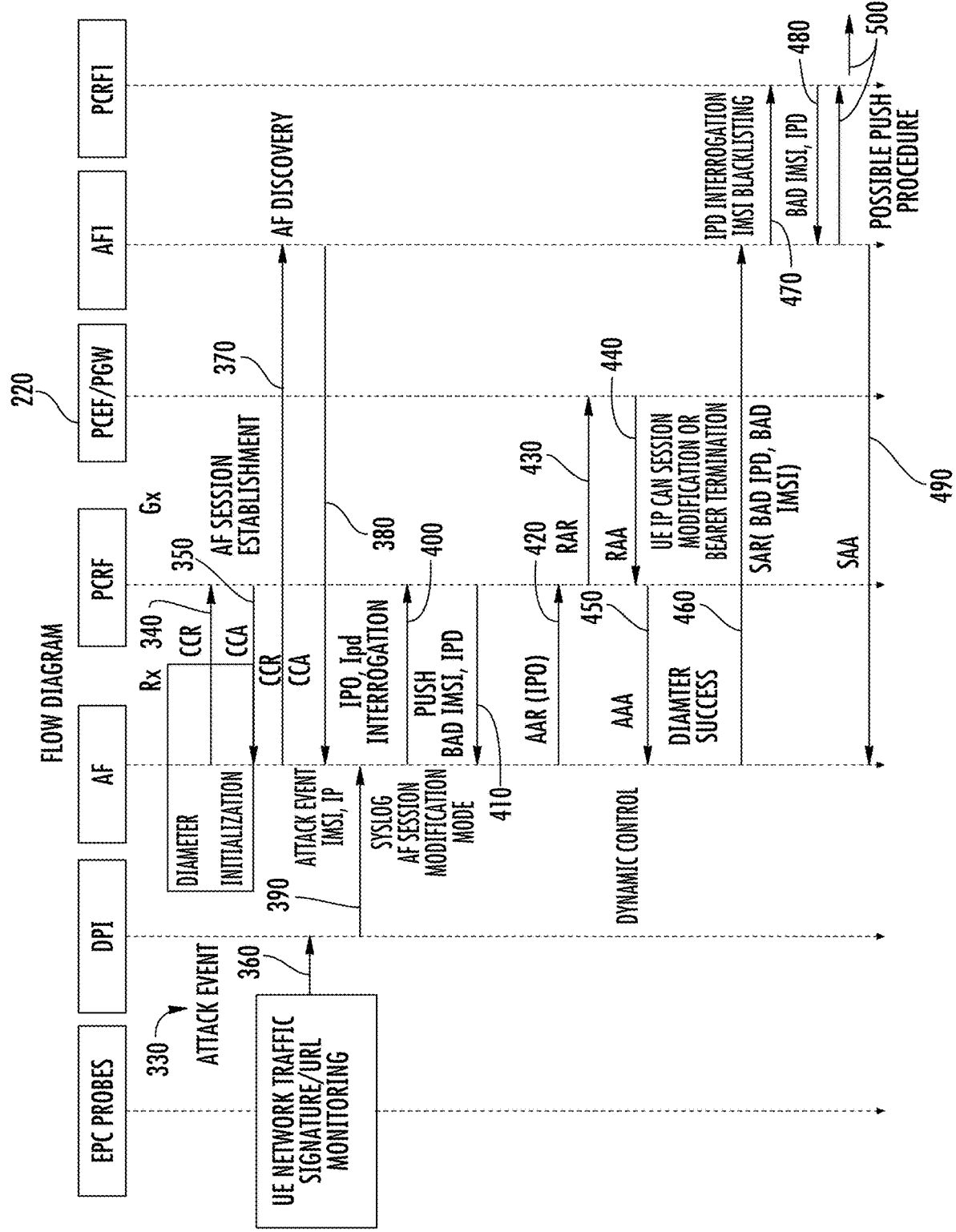
FIG. 4 is a flow diagram illustrating another method of using the systems of FIGS. 1 and 2.

As shown in FIG. 4, once an attack has been identified at 330, such as by the deep packet inspection engine 184 or other manner, the application function 190 may establish Diameter initialization with the PCRF 200 via a credit control request (CCR) at 340 that may be returned via a credit control answer (CCA) at 350 for AF session establishment. The deep packet inspection engine 184 may analyze the UE network traffic and conduct signature and URL monitoring at 360. The application function 190 in the first network 170 may be send a credit control request (CCR) at 370 to the application function 190 in the second network 174 for application function discovery, and a credit control answer (CCA) at 380 may be returned by the application function 190 in the second network 174. An attack alert generated by the DPI engine 184 may be transported to the application function 190 at 390 via simple network management protocol (SNMP), Syslog or the like. The application function 190 may interrogate the PCRF 200 at 400 to obtain a list of one or more bad internal or external Internet Protocol (IP) addresses or malicious international mobile subscriber identities (IMSIs). The PCRF 200 may respond at 410 with a list of one or more bad internal or external Internet Protocol (IP) addresses or malicious international mobile subscriber identities (IMSIs). The application function 190 may initiate an unsolicited push procedure by sending an authentication authorization request (AAR) at 420 to the PCRF 200 to block user traffic for Local IP addresses and ports. The PCRF 200 may send at 430 a re-authorization request (RAR) to the policy and charging enforcing function module (PCEF) 220, and the PCEF 220 may respond at 440 with a re-authorization answer (RAA). The PCRF 200 may send at 450 an authentication authorization answer (AAA) to the application function 190. The steps shown at 420, 430, 440 and 450 is an unsolicited PUSH procedure within the first network 170 over an Rx Diameter interface to mitigate a DDos attack on identified devices 102, 111. The application function 190 at 460 may send information about malicious IPs and IMSIs higher up the AF hierarchy via a security alert request (SAR), such as to an application function 190 within the second network 174 controlled by the second carrier 176 and to other application functions 190 within other networks. The SAR at 460 may be Alert propagation using new Rs protocol to other remote application functions 190 and the like in hierarchy. The remote application function 190 within the remote second network 174 may interrogate the PCRF 200 at 470 within the remote second network 174 to shut down malicious IP addresses and IMSIs, if any, via a SAR. The PCRF 200 in the second network 174 may respond at 480 with malicious IP addresses and IMSIs. The remote application function 190 within the remote second network 174 may respond at 490 to the application function 190 in the first network 170 with a security alert answer (SAA), which may be acknowledgement information in Rs protocol. The PCRF 200 in the second network 174 may initiate an unsolicited PUSH procedure to send information about malicious IPs and IMSIs to other parts of the first network 170 or second network 174 in another carrier at 500. Mitigation within other LTE/3G 3GPP networks could be again be sent via an unsolicited PUSH procedure. For other types of networks, alert information could be sent via WiFi, bluetooth, LAN or other appropriate method depending on a Network Controller.

The interrogation conducted by the remote application function 190 within the remote second network 174 of the PCRF 200 at 470 via a SAR may be via a Rs Diameter security alert request (SAR), as shown in FIG. 5. The SAR may include a new common vulnerabilities and exposures (CVE)-ID syntax that may be variable in length. The CVE-ID may include a CVE prefix+year+arbitrary digits. The variable length arbitrary digits may begin at four fixed digits and expand with arbitrary digits only when needed in a calendar year, for example, CVE-YYYY-NNNN and if needed CVE-YYYY-NNNNN, CVE-YYYY-NNNNNNN and on, if needed.

Figure 6:
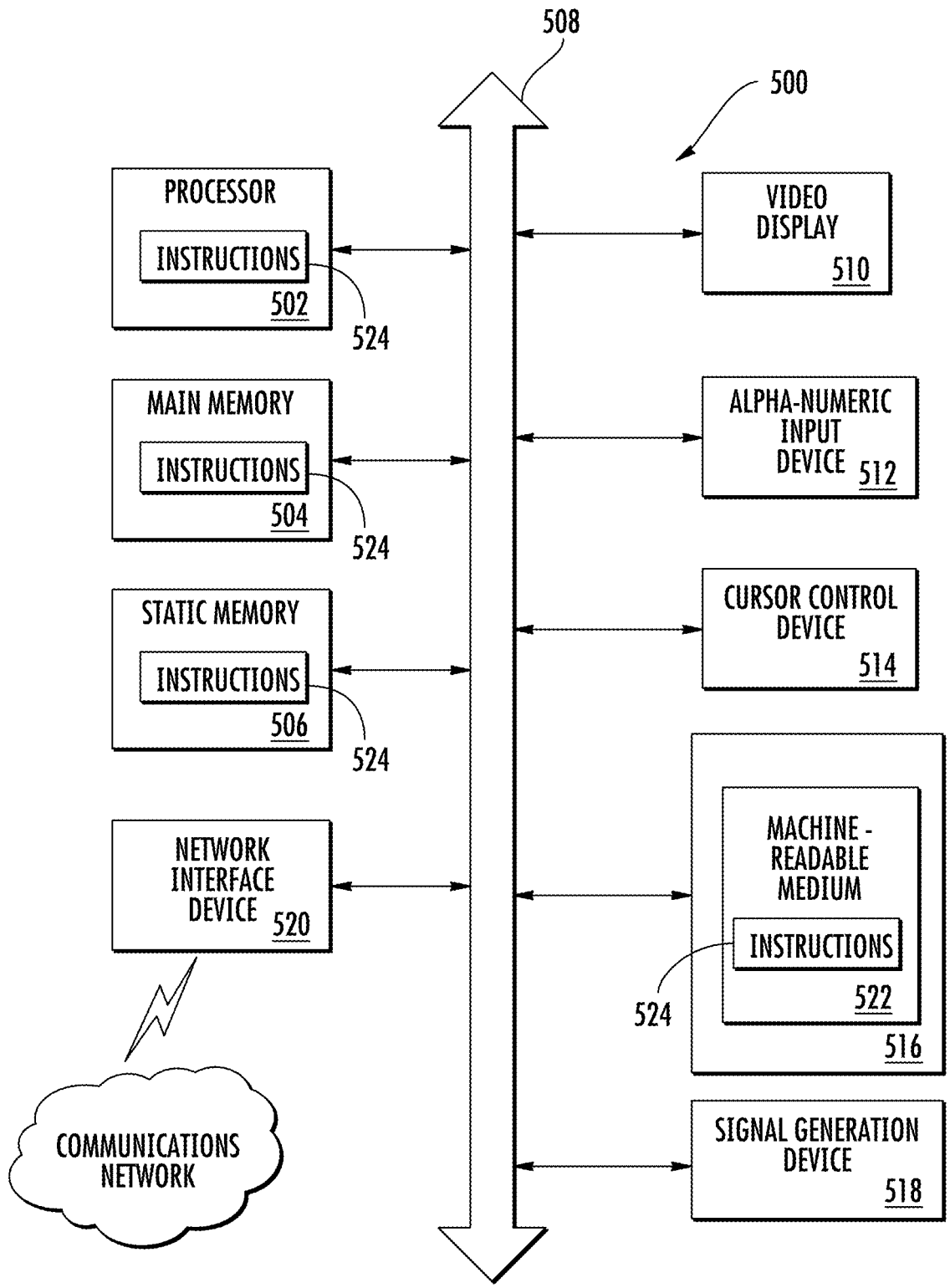
FIG. 6 is an illustrative embodiment of a general computer system.

As shown in FIG. 6, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using EPC network 124, communications network 135, RAN 121, another network, or a combination thereof) to and assist with operations performed by other machines and systems, such as, but not limited to, the first user device 102, the second user device 111, the hardware element 120, the server 140, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 522 containing instructions 524 so that a device connected to the EPC network 124, the internet/communications network 135, RAN 121, another network, or a combination thereof, can send or receive voice, video or data, and to communicate over the EPC network 124, the internet/communications network 135, RAN 121, another network, or a combination thereof, using the instructions. The instructions 524 may further be transmitted or received over the EPC network 124, the internet/communications network 135, RAN 121, another network, or a combination thereof, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that executes the instructions to perform operations, the operations comprising:
   analyzing internet traffic to determine an occurrence of an attack within a first network administered by a first carrier;
   blocking a portion of the internet traffic; and
   providing an attack alert to a second network administered by a second carrier,
   wherein the first and second carriers are different entities,
   wherein providing the attack alert further comprises providing the attack alert to the second network by causing an application function of the first network to transmit a security alert request to an application function in the second network, and
   wherein the security alert request is utilized to interrogate a policy and charging rules function of the second network to shut down a malicious internet protocol address associated with the internet traffic.

2. The system of claim 1, wherein the operations further comprise initiating, by utilizing the application function of the first network, an unsolicited push request to a policy and charging rules function of the first network to facilitate blocking the portion of the internet traffic.

3. The system of claim 2, wherein the operations further comprise sending an authentication authorization request to the policy and charging rules function of the first network to facilitate initiating the unsolicited push request.

4. The system of claim 1, wherein the operations further comprise discovering the application function in the second network by utilizing a credit control request sent from the application function of the first network.

5. The system of claim 1, wherein the operations further comprise generating the attack alert after determining the occurrence of the attack.

6. The system of claim 1, wherein the operations further comprise providing the attack alert to an application function aggregator prior to providing the attack alert to the second network.

7. The system of claim 1, wherein the operations further comprise providing the attack alert to the second network by utilizing diameter based security protocol.

8. The system of claim 1, wherein the operations further comprise conducting signature and uniform resource locator monitoring on the internet traffic.

9. The system of claim 1, wherein the operations further comprise interrogating a policy and charging rules function of the first network to obtain a list of malicious internal or external internet protocol addresses.

10. The system of claim 1, wherein the operations further comprise analyzing the internet traffic by utilizing a deep packet inspection engine at an evolved packet core.

11. The system of claim 1, wherein the operations further comprise initiating an Rs security protocol to send the attack alert to the second network.

12. The system of claim 1, wherein the operations further comprise receiving a credit control answer from the application function in the second network in response to a credit control request.

13. A method, comprising:
   analyzing, by utilizing instructions from a memory that are executed by a processor, internet traffic to determine an occurrence of an attack within a first network administered by a first carrier;
   blocking a portion of the internet traffic; and
   providing an attack alert to a second network administered by a second carrier,
   wherein the first and second carriers are different entities,
   wherein providing the attack alert further comprises providing the attack alert to the second network by causing an application function of the first network to transmit a security alert request to an application function in the second network, and
   wherein the security alert request is utilized to interrogate a policy and charging rules function of the second network to shut down a malicious internet protocol address associated with the internet traffic.

14. The method of claim 13, further comprising interrogating a policy and charging rules function of the first network to obtain a list of malicious internal or external internet protocol addresses.

15. The method of claim 13, further comprising conducting signature and uniform resource locator monitoring on the internet traffic.

16. The method of claim 13, further comprising discovering the application function in the second network by utilizing a credit control request sent from the application function of the first network.

17. The method of claim 13, further comprising initiating, by utilizing the application function of the first network, an unsolicited push request to a policy and charging rules function of the first network to facilitate blocking the portion of the internet traffic.

18. The method of claim 17, further comprising sending an authentication authorization request to the policy and charging rules function of the first network to facilitate initiating the unsolicited push request.

19. The method of claim 13, further comprising receiving a credit control answer from the application function in the second network in response to a credit control request.

20. A non-transitory computer-readable device comprising instructions, which when executed by a processor, cause the processor to perform operations comprising:
- analyzing internet traffic to determine an occurrence of an attack within a first network administered by a first carrier;
- blocking a portion of the internet traffic; and
- transmitting an attack alert to a second network administered by a second carrier,
    - wherein the first and second carriers are different entities,
    - wherein transmitting the attack alert further comprises providing the attack alert to the second network by causing an application function of the first network to transmit a security alert request to an application function in the second network, and
    - wherein the security alert request is utilized to interrogate a policy and charging rules function of the second network to shut down a malicious internet protocol address associated with the internet traffic.

* * * * *